United States Patent [19]

Bonner et al.

[11] Patent Number: 5,792,530
[45] Date of Patent: Aug. 11, 1998

[54] FOOD PACKAGING COMPRISING POLYKETONE/PVC BLEND

[75] Inventors: James Graham Bonner, Edinburg; Anthony Keith Powell, Linlithgow, both of Scotland

[73] Assignee: BP Chemicals Limited, London, England

[21] Appl. No.: 696,364

[22] Filed: Aug. 13, 1996

[30] Foreign Application Priority Data

Aug. 21, 1995 [GB] United Kingdom ............... 9517106

[51] Int. Cl.[6] ..................... C08L 73/00; C08L 27/06
[52] U.S. Cl. .................... 428/36.6; 525/185; 426/106; 426/415; 264/331.15; 264/331.17; 264/331.18
[58] Field of Search ................. 525/185; 426/106, 426/415; 428/36.6; 264/331.15, 331.17, 331.18

[56] References Cited

U.S. PATENT DOCUMENTS

| 3,780,140 | 12/1973 | Hammer | 260/884 |
| 5,084,510 | 1/1992 | Braden et al. | 525/66 |
| 5,204,412 | 4/1993 | Davidson et al. | 525/185 |
| 5,209,983 | 5/1993 | Case et al. | 428/514 |
| 5,232,786 | 8/1993 | Waters et al. | 428/475.8 |

FOREIGN PATENT DOCUMENTS

| 695883 | 10/1964 | Canada . |
| 089243 | 9/1983 | European Pat. Off. . |
| 234468 | 9/1987 | European Pat. Off. . |
| 669375 | 8/1995 | European Pat. Off. . |
| 2149932 | 3/1973 | France . |
| 2149933 | 3/1973 | France . |

*Primary Examiner*—Frederick Krass
*Attorney, Agent, or Firm*—Fay, Sharpe, Beall, Fagan, Minnich & McKee

[57] ABSTRACT

Food packaging comprises a blend of polyketone and PVC. The blends show good oxygen barrier properties without serious deterioration of moisture barrier performance. Terpolymers of ethylene, propylene and CO are preferred. PVC having a K-value of 50 to 80 are preferred.

8 Claims, No Drawings

FOOD PACKAGING COMPRISING POLYKETONE/PVC BLEND

The present invention relates to food packaging comprising a polymer blend of polyketone and PVC in particular uPVC.

For the purposes of this patent, polyketones are defined as linear polymers having an alternating structure of (a) units derived from carbon monoxide and (b) units derived from one or more olefinically unsaturated compounds.

Such polyketones have the formula:

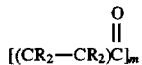

where the R groups are independently hydrogen or hydrocarbyl groups, and m is a large integer; they are disclosed in several patents e.g. U.S. Pat. No. 3,694,412. Processes for preparing the polyketones are disclosed in U.S. Pat. No. 3,694,412 and also in EP 181014 and EP 121965. Although for the purposes of this patent polyketones correspond to this idealised structure, it is envisaged that materials corresponding to this structure in the main but containing small regimes (i.e. up to 10 wt %) of the corresponding homopolymer or copolymer derived from the olefinically unsaturated compound, also fall within the definition.

Polyketones particularly those prepared using ethylene and CO have high melting points which are close to the temperatures at which they undergo chemical degradation. EP 213671 teaches that polyketones comprising carbon monoxide, ethylene and an alpha olefin (eg propylene) units have lower melting points than corresponding copolymers comprised only of carbon monoxide and ethylene units.

Although polyketones are known to exhibit good barrier properties, in particular oxygen barrier properties, it is desirable to improve these properties. It has now been found that the addition of PVC, in particular uPVC can be used to enhance the oxygen barrier performance of polyketones without serious deterioration of its moisture barrier performance.

Thus according to the present invention, there is provided food packaging comprising a blend of polyketone and PVC.

Blends of polyketone and PVC are particularly advantageous when used for food packaging since polyketones can be used to improve the thermal properties of PVC, while at the same time retaining good barrier properties.

As noted above for the purposes of this patent, polyketones are defined as linear polymers having an alternating structure of (a) units derived from carbon monoxide and (b) units derived from one or more olefinically unsaturated compounds. Suitable olefinic units are those derived from $C_2$ to $C_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularly preferred that the olefin units are either derived from ethylene or most preferred of all from a mixture of ethylene and one or more $C_3$ to $C_6$ normal alpha-olefin(s) especially propylene. In these most preferable materials it is further preferred that the molar ratio of ethylene units to $C_3$ to $C_6$ normal alpha-olefin units is greater than or equal to 1 most preferably between 2 and 30. Typically, the polyketone will be a terpolymer of ethylene/propylene/CO where the units derived from propylene are present in the range 5–8% e.g. 6% by weight of the polymer. The Melt Flow Rate (5 kg load at 240° C.) is typically in the range 5–200 preferably 10–150, more preferably 20–100 for example 40–80 g/10 mins.

The polyketone will suitably have a number average molecular weight of between 40,000 and 1,000,000 preferably between 50,000 and 250,000 for example 60,000 to 150,000. A preferred polyketone is a ethylene/propylene/CO terpolymer having a number average molecular weight in the range 60,000 to 150,000.

As regards the PVC it can be either Plasticised (Flexible) PVC or unplasticised (rigid) PVC (uPVC); it is particularly with uPVC that this invention is concerned. Where uPVC is used, it may contain a small amount for example up to 20% but preferably less than 5% by weight of plasticisers; however where a more flexible material is needed, plasticised PVC will be used. Typical plasticisers are phthalates, phoshates, and trimellitates.

As regards the Molecular Weight of PVC, this is measured by its K-value. PVCs will typically have a K-value in the range 45 to 100, preferably 50 to 80 especially 55 to 75, e.g. 60 to 70.

The PVC may comprise conventional additives such as heat stabilisers, blowing agents (for foams) filler, lubricants and pigments.

The polymer blend composition of the present invention can be prepared using conventional techniques and equipment for batch or continuous blending.

The weight ratio of polyketone to PVC is suitably in the range 1:10 to 10:1 preferably 1:3 to 3:1 more preferably 1:1.5 to 1.5:1 for example 1:1. However, it is preferred to use 1–50% by weight of PVC preferably 1–20 more preferably 5–15% e.g 10% (i.e. apolyketone to PVC ratio of 9:1). Other polymers may be blended with the blend composition of the present invention; the nature and amount of such a polymer will depend upon what modifications of the polymer properties are required. Furthermore the blends of the present invention may contain conventional polymer additives such as anti-oxidants, stabilisers, and mould release agents.

The scope of the present invention extends to articles for example moulded articles comprising the blends as defined hereinbefore insofar as they are for use with food.

In a further aspect of the present invention there is provided foodstuff contained in packaging made from a blend of polyketone and PVC.

In yet another aspect of the present invention there is provided the use of a blend of polyketone and PVC to package foodstuffs.

In another aspect of the present invention there is provided packaging made from polyketone and PVC and instructions for use with foodstuffs.

The invention is illustrated by the following examples.

Materials
Polyketone:
Ethylene/Propylene/CO terpolymer 205° C., MFR=19 g/10 mins (240° C., 5 kg).

uPVC Compound:
Window profile grade from Elf-Atochem, barium/cadmium stabiliser package, acrylic impact modifiers and calcium carbonate filler, with a K value of 68.

Compounding
A series of EPCO/uPVC blends were prepared using an APV (15 mm) twin screw extruder. Blends containing 10, 20, 30, 50, 70% w/w uPVC were subsequently compression moulded into ~500 μm plaques using the 40 tonne Komtek Press.

Characterisation
Differential scanning calorimetry (DSC) was carried out using a Perkin-Elmer Series (7) Thermal Analyser. A heating rate of 10° C./min up to 230° C. was used to condition each material, then the sample was cooled from 230° to −40° C. at the same rate; each cycle was performed under a nitrogen purge. A proportioned weight of uPVC was placed in the reference pan in order that the EPCO phase could be studied in isolation. The melting point (Tm) and the heat of fusion ($\Delta Hf$) were evaluated from the second heating (10° C./min) endotherm. The results are shown in Table 1.

The oxygen and moisture barrier performance was measured using the Oxtran (1000) ASTM D3985 and Permatran (W1) ASTM F-1249-89 respectively.

The 10 cm×10 cm×(~500 μm) moulded plaques samples were initially assessed using the Oxtran (1000) at 23° C. and 0, 75 and 90% Relative Humidity (RH) and subsequently using the Permatran (W1A) at 38° C., 90% RH. The results are shown in Table 2.

TABLE 1

CHARACTERISATION OF EPCO/uPVC BLENDS

| Material | Melting Point (°C.) | Heat of Fusion $\Delta Hf$ (J/g) |
|---|---|---|
| EPCO | 206 | 56.5 |
| +10% uPVC | 194 | 53.4 |
| +20% uPVC | 189 | 47.0 |
| +30% uPVC | 185 | 33.0 |
| +50% uPVC | 185 | 32.7 |
| +70% uPVC | 180 | 32.5 |
| uPVC | N/A | N/A |

TABLE 2

Oxygen and Moisture Barrier Results

| Material | Oxygen Permeability (cc. mm/m2/day/atm) | | | Moisture Permeability Coefficient (g.mm/m2/day/atm) |
|---|---|---|---|---|
| Material | (23° C., 0% RH) | (23° C., 75% RH) | (23° C., 90% RH) | (38° C., 90% RH) |
| EPCO | 0.081 | 0.053 | 0.095 | 3.18 |
| +10% uPVC | 0.045 | 0.010 | 0.044 | 5.42 |
| +20% uPVC | 0.224 | 0.764 | 0.960 | 4.37 |
| +30% uPVC | 0.656 | 1.392 | 1.620 | 4.44 |
| +50% uPVC | 0.587 | 1.147 | 1.387 | 3.20 |
| +70% uPVC | 1.034 | 2.126 | 2.452 | 1.51 |
| uPVC | 3.548 | 3.473 | 3.484 | 0.96 | oxide and (b) units derived from one or more olefinically unsaturated compounds, and polyvinyl chloride (PVC) as a food packaging material wherein the oxygen barrier performance and thermal properties of the PVC are improved by blending the PVC with polyketone while maintaining effective moisture barrier properties of the polyketone, comprising packaging a foodstuff in the polyketone/PVC material.

2. A method of using a blend of polyketone and polyvinylchloride (PVC) as a food packaging material, wherein the oxygen barrier performance and thermal properties of the PVC are improved by blending the PVC with polyketone while maintaining effective moisture barrier properties of the polyketone, comprising packaging a foodstuff in the polyketone/PVC material.

3. The method according to claim 2 wherein the blend comprises 1–20% by weight of PVC.

4. The method according to claim 3 wherein the blend comprises 5–15% by weight of PVC.

5. The method of claim 2 wherein the polyketone is a terpolymer of ethylene, a $C_3$ to $C_6$ normal alpha-olefin and carbon monoxide.

6. The method of claim 5 wherein the alpha-olefin is propylene.

7. The method of claim 5 wherein the polyketone has a Melt Flow Rate (5 kg load at 240° C.) in the range of about 40 to 80 g/10 mins.

8. The method of claim 1 wherein the PVC has a K-value in the range of about 50 to about 80.

We claim:

1. A method of using a blend of polyketone which has an alternating structure of (a) units derived from carbon mon-

* * * * *

UNITED STATES PATENT AND TRADEMARK OFFICE
CERTIFICATE OF CORRECTION

PATENT NO. : 5,792,530
DATED : August 11, 1998
INVENTOR(S) : Bonner et al.

It is certified that error appears in the above-identified patent and that said Letters Patent is hereby corrected as shown below:

Claim 8 should read:

8. The method of claim 2 wherein the PVC has a K-value in the range of about 50 to about 80.

Signed and Sealed this

Third Day of November, 1998

Attest:

Attesting Officer

BRUCE LEHMAN

Commissioner of Patents and Trademarks